2,744,728

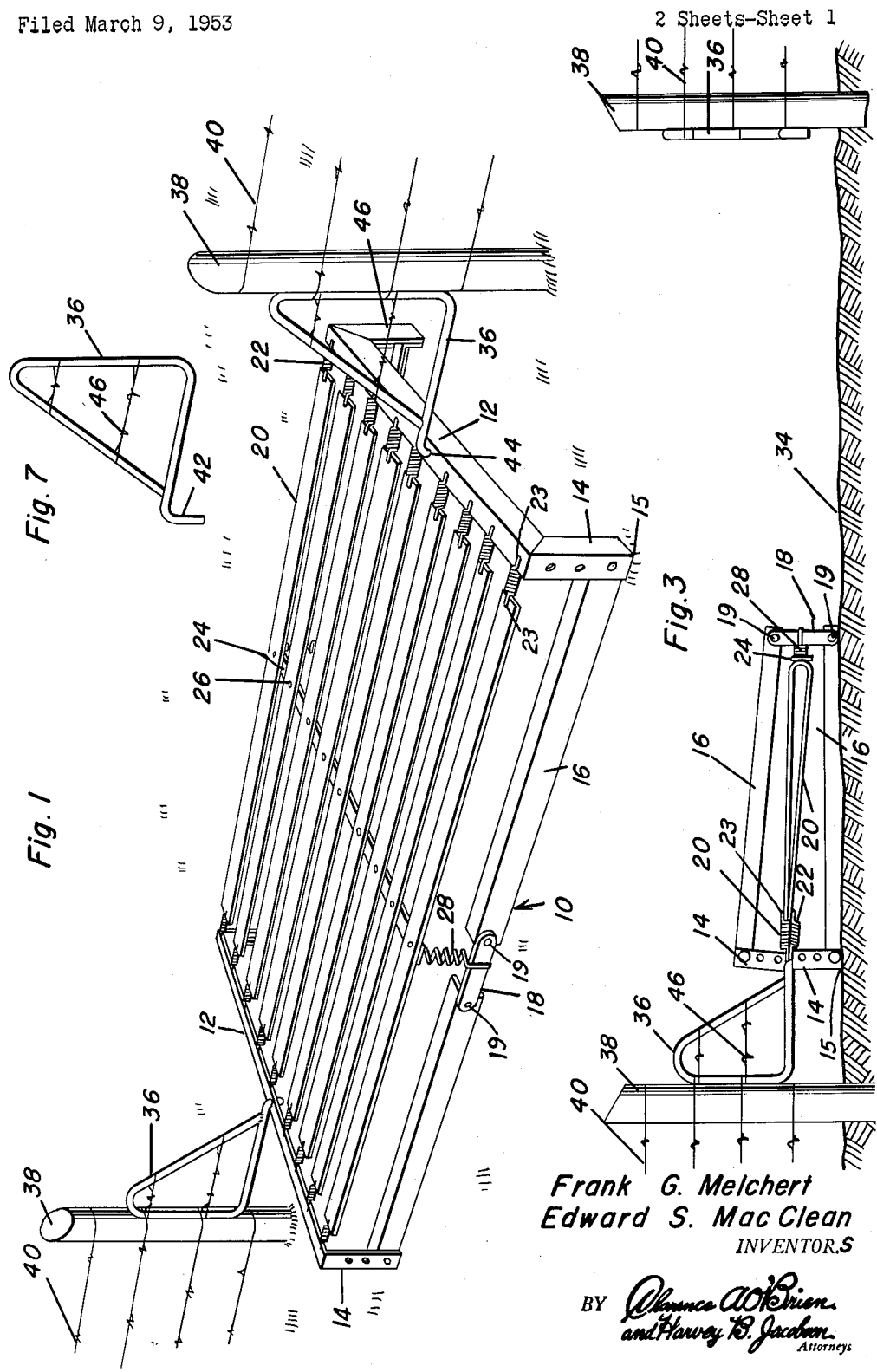

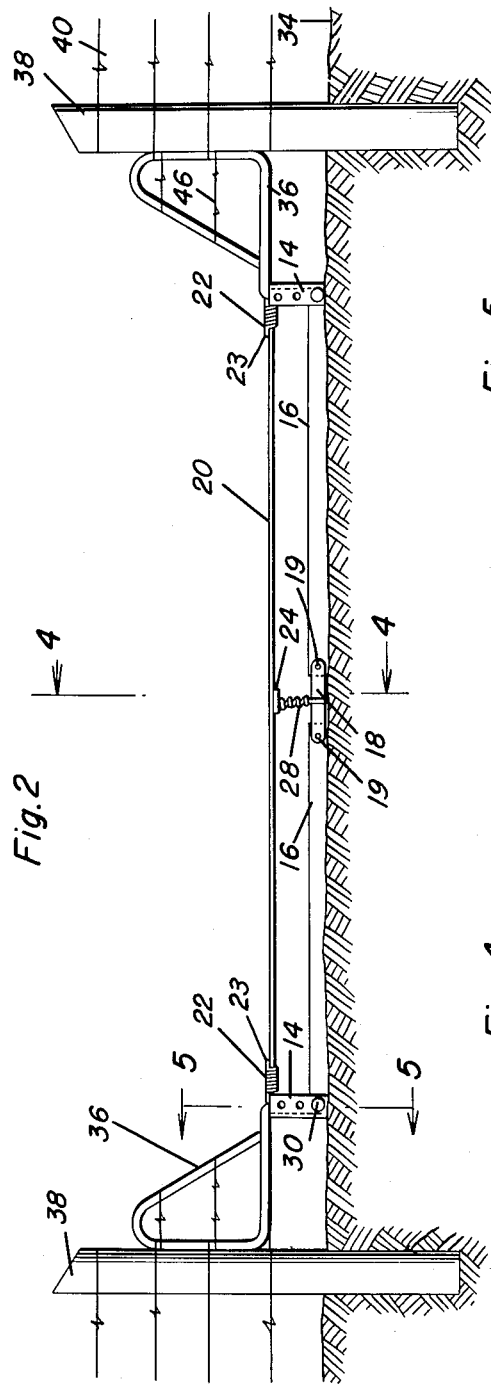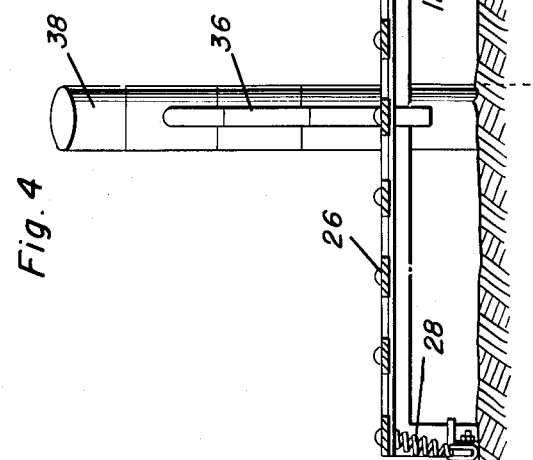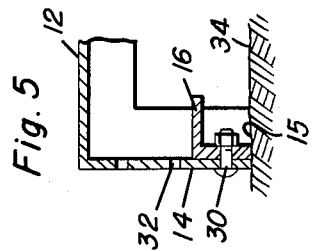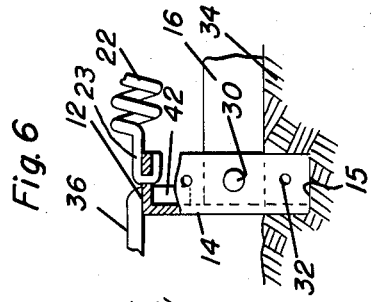
Frank G. Melchert
Edward S. Mac Clean
INVENTORS

United States Patent Office 2,744,728
Patented May 8, 1956

FOLDING CATTLE GUARD

Frank G. Melchert, Torrington, and Edward S. MacClean, Cheyenne, Wyo.

Application March 9, 1953, Serial No. 340,964

2 Claims. (Cl. 256—14)

This invention relates to a pitless, folding cattle guard, and more specifically provides a device for positioning in an opening in a fence or the like and resting on a supporting surface for preventing the passage of animals, such as cattle.

An object of this invention is to provide a cattle guard embodying a set of spaced straps extending transversely of the passage which is to be guarded and supported by resilient means in an elevated position, whereby the spaces between the straps create an impression of depth and insecure footing and thus discourse the travel of cattle thereover.

Another object of the present invention is to provide a cattle guard including resiliently mounted straps which permit depression of the straps to the ground to facilitate passage of persons and vehicles thereover and which automatically return to their elevated position as soon as such persons or vehicles have passed.

Still another important object of this invention is to provide a cattle guard that is foldable, wherein a portion of the cattle guard may be raised, thereby permitting the passage of cattle or which may be folded into a compact position for easy portability.

Another important feature of the present invention is the provision of a cattle guard that is simple in construction, light in weight, foldable, well adapted for its purposes and relatively inexpensive to manufacture.

These together with other objects and advantages which will become subsequently apparent resside in the details of construction and operation as more fully hereinafter described and claimed, reference being had to the accompanying drawings forming a part hereof, wherein like numerals refer to like parts throughout, and in which:

Figure 1 is a perspective view showing the cattle guard of the present invention positioned in a passage or opening in a fence;

Figure 2 is a side elevational view of the construction of Figure 1;

Figure 3 is a side elevational view similar to Figure 2 showing the cattle guard in its folded position, thereby permitting the passage of cattle through the passage alongside the folded cattle guard;

Figure 4 is an enlarged transverse, vertical section taken substantially along section line 4—4 of Figure 2 showing the details of construction of the cattle guard of the present invention;

Figure 5 is an enlarged detailed section taken along section line 5—5 of Figure 2 showing the mounting of the side rails on the depending risers;

Figure 6 is a view similar to Figure 5 but shows the side rails positioned in adjusted condition wherein the ends of the depending end rails may be embedded in the ground for precluding sliding movement of the cattle guard; and Figure 7 is a perspective detail view showing one of the wings utilized in the present invention for directing cattle towards the cattle guard.

Referring now specifically to the drawings, it will be seen that the numeral 10 generally designates the pitless, folding cattle guard of the present invention and includes a pair of cross or end rails 12 having depending risers 14 at each end thereof and a pair of side rails 16 interconnecting the risers 14 at each end of the end rails 12. Each pair of side rails 16 is sectional and hingedly connected by a link or strap hinge 18 adjacent ends of the rail sections by pivot pins 19 at the midpoint of the cattle guard 10. It will be seen that the strap hinge 18 permits the side rails 16 to be pivoted in relation to each other wherein the side rails may be positioned substantially in overlying relation and parallel relation with each other and the end rails 12 may also be positioned in overlying relation, for a purpose described hereinafter. A plurality of flexible elongated straps 20 are positioned between the end rails 12 in transversely spaced relation and secured thereto by a resilient coil tension spring 22 attached at end points 23 at each end of each strap 20, thereby permitting the straps 20 to be depressed in a manner hereinafter described. A cross-strap 24 is positioned under the longitudinal strap 20 substantially at the center thereof and secured thereunder by suitable rivets 26 or other fastening means. The ends of the transverse cross-strap 24 are resiliently connected to the strap hinge 18 by a coil spring 28. The ends of the side rails 16 which are secured to the risers 14 on the end rail 12 are adjustable and secured in adjusted position by a fastening means 30 which may be selectively engaged with vertically spaced apertures 32 in the risers 14, thereby permitting the lower end 15 of the risers 14 to be embedded in the supporting ground or soil 34, substantially as illustrated in Figure 6. A wing member 36 is hingedly secured to a vertical post 38 for supporting a plurality of wires 40 which form a fence, and the wing 36 includes a depending hook-like member 42 for engaging a suitable aperture 44 positioned centrally of the end rails 12. A wing member 36 is positioned at each end of the cattle guard 10 and will prevent cattle from by-passing the cattle guard 10. As specifically shown, wire members 46 are disposed across the wing members 36 in order to prevent the passage of small cattle therethrough. It will be seen that the wing members 36 may be disengaged from the aperture 44 and pivoted to an out-of-the-way position, thereby permitting either end of the cattle guard 10 to be raised and folded to a position overlying the other end of the cattle guard 10, thereby permitting the passage of cattle through the passage formed by the fence posts 38. Where it is desired to have only a temporary installation, it would be unnecessary to utilize the wing members 36.

The operation of the device will be readily understood. The cattle guard 10 is positioned in the opening in the fence defined by the vertical fence posts 38 and the wing members 36 are positioned with the downturned hook members 42 within the apertures 44 in the end rails 12, thereby guiding the animals onto the cattle guard 10. It will be understood that the transversely spaced flexible members 20 ordinarily would stop the passage of animals, but if it became necessary, animals may be forced across the cattle guard 10 without injury or damage. A vehicle may be passed over the cattle guard 10 inasmuch as the flexible straps 20 and 24 permit depression to the ground level which will support the vehicle. As soon as the vehicle has passed over the cattle guard 10, the resilient springs 22 return the flexible straps 20 to their original position in spaced relation to the supporting surface. The side rails 16 may be vertically adjustable on the vertical risers 14, thereby permitting the lower end of the risers 14 to be embedded in the supporting soil 34, thereby assuring that the cattle guard 10 will not be displaced by the forces exerted by a vehicle passing over the cattle guard 10 at a rapid rate. By disengaging the downturned hook member 42 of the wing 36 by moving the wing 36 upwardly in sliding engagement with the wires 40, either end of the cattle guard 10 may be raised into overlying relation with the other end, thereby providing a passage for the animals. Further, it may be seen that the device of the present invention is easily portable to another location when the side rails 16 and the end rails 12 have been folded into an overlying and parallel relation. The coil spring 28 interconnecting the cross strap 24 and the strap hinges 18 is utilized to resiliently limit the movement of the straps 20 and also retain the straps 20 in untangled condition when the cattle guard 10 is folded. Obviously, the various components of the cattle guard 10 may be constructed of readily obtainable materials, and as illustrated, angle iron members are especially adapted for the end rails 12 and the side rails 16, and the longitudinal straps 20 and the cross-strap 24 may be constructed of similar metallic members wherein the cross-strap 24 retains the longitudinal straps in correct transverse spacing.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a cattle guard the combination of a pair of elongated end members, each having a normally extending riser at its ends, adapted to be supported on the ground in substantially parallel relation to extend through a gateway, a sectional side rail interconnecting opposed risers, hinge means interconnecting the sections of each side rail, a plurality of depressible flexible straps extending between the end members and normally disposed above the ground for providing an insecure footing for cattle, said hinge means permitting the end members and adjacent sections of the side rails and the ends of the flexible straps to be folded in generally overlying condition for permitting free passage of cattle through the gateway.

2. The cattle guard as defined in claim 1 wherein said hinge means includes a link pivotally connected to the adjacent ends of adjacent sections of each side rails for spacing the adjacent ends of the side rails when the end members are disposed in overlying relation whereby the sections of the rails are disposed in substantially spaced parallel relation for receiving the folded flexible straps therebetween, a cross-strap interconnecting said flexible straps, and resilient means interconnecting said cross-strap and said links for retaining the folded flexible straps substantially in parallel relation to the overlying sections of the side rails.

References Cited in the file of this patent

UNITED STATES PATENTS

| | | |
|---|---|---|
| 750,524 | Dawson | Jan. 26, 1904 |
| 984,001 | Ingraham | Feb. 14, 1911 |
| 2,535,795 | Henningsen | Dec. 26, 1950 |
| 2,539,214 | Warner | Jan. 23, 1951 |
| 2,576,188 | McPherson | Nov. 27, 1951 |